Aug. 31, 1937. W. E. MOLINS 2,091,516
SCALE PAN FOR WEIGHING CIGARETTES
Filed Oct. 5, 1934
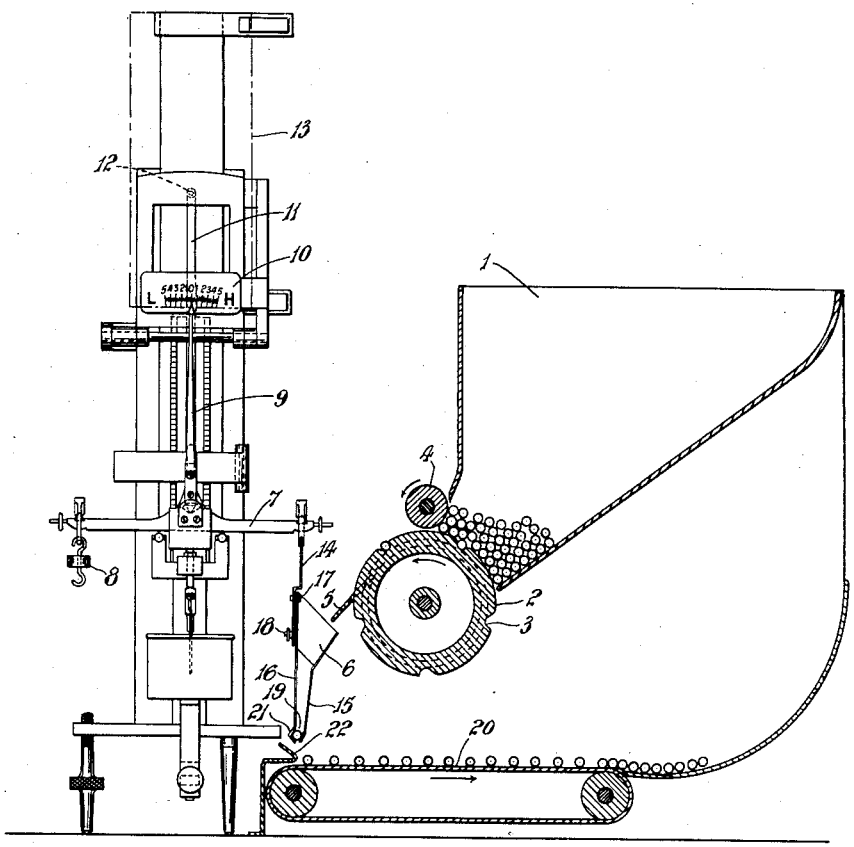
INVENTOR
W. E. Molins.
By Watson, Coit, Moore & Grindle
ATTYS.

Patented Aug. 31, 1937

2,091,516

UNITED STATES PATENT OFFICE 2,091,516

SCALE PAN FOR WEIGHING CIGARETTES

Walter Everett Molins, Deptford, London, England; Harold Bernardo Molins and Moses Hyman Isaacs, executors of said Walter Everett Molins, deceased, assignors to Molins Machine Company Limited, London, England Application October 5, 1934, Serial No. 747,061
In Great Britain October 6, 1933

9 Claims. (Cl. 265—27)

This invention relates to weighing apparatus, and has for its object to provide an improved scale or balance for weighing light articles, for example, cigarettes.

It has hitherto been proposed to periodically weigh a certain quantity of cigarettes, generally one ounce, and in some instances, this has been effected by placing a quantity of cigarettes into a hopper from which they have been removed and placed in batches in the scale pan of the weighing apparatus. It has also been proposed to remove a number of cigarettes from the continuous rod line of a cigarette making machine and to insert batches of cigarettes into the scale pan of a weighing apparatus, and thereafter to regulate the quantity of tobacco fed to the cigarette making machine according to the result of such weighing operation.

The inspection of the weights of the cigarettes weighed in quantities is not an indication of the variations which occur in the cigarettes individually, inasmuch as one ounce of cigarettes may be composed of cigarettes varying individually to a far greater extent than the collective weights show, so that a cigarette making machine may be showing regular collective manufacture, but very bad individual manufacture.

A much more accurate indication of the quality of the cigarettes being manufactured by a machine is obtained by weighing the cigarettes individually and expressing in percentages the number of individual cigarettes produced within certain predetermined limits.

According to the present invention there is provided apparatus for checking the consistency of cigarettes, comprising mechanism for feeding cigarettes individually to the scale pan of a weighing device and means to record the weight of each individual cigarette. The cigarettes may be delivered individually to the scale pan of a weighing device from a hopper (e. g., by a fluted drum) or the cigarettes may be delivered individually to the scale pan of a weighing device from a cigarette making machine (e. g., from the rod line of a continuous rod machine) and each cigarette may be removed from the scale pan after its weight has been recorded and before the next cigarette is weighed.

Further, according to the present invention, there is provided in or for a weighing device, a scale pan having means whereby it may be operatively connected with the beam of a weighing device, and means operative to retain an article in the scale pan during a weighing operation, said last named means being operated by the next succeeding article to be weighed to release the weighed article from the pan. The scale pan may be provided with at least one movable (e. g., flexible) side for a purpose hereinafter specified, and the movable side may be adjustable for a purpose hereinafter set forth.

The invention will be more particularly described with reference to the accompanying drawing, which is a side elevation, partly in section, of one form of apparatus constructed in accordance with the invention.

Like references refer to like parts throughout the specification and drawing.

Referring to the form of the invention illustrated in the drawing, the cigarettes to be weighed are placed in a hopper 1 and are removed therefrom by a drum 2, having flutes 3 disposed at intervals around its periphery. As the drum 2 is rotated, preferably by mechanical means, the flutes pass through the hopper, and cigarettes are allowed to fall into the flutes as shown in the drawing. At the outlet end of the hopper, a movable element is provided, and is shown in the drawing as the roller 4. This roller is rotated so that the surface of the roller which is adjacent to the surface of the drum 2 is moving in an opposite direction to the direction in which the adjacent surface of the drum 2 is moving. The roller 4 is provided since it is found that there is a tendency for a second cigarette to be carried forwardly together with the cigarette contained in a flute of the drum, and it is found that if the front wall of the hopper is arranged in close proximity to the periphery of the drum 2 the second cigarette tends to jam between the fixed edge of the hopper and the moving surface of the drum, so causing an interruption in the operation of the apparatus. By providing a movable surface such as the roller 4, should a second cigarette be carried forwardly together with the cigarette contained in a flute, the action of the moving surface tends to move the surplus cigarette backwardly into the hopper and so prevents the possibility of a jam occurring at the outlet point of the hopper. If desired, the surface of the roller 4 may be fluted, knurled or otherwise roughened in order to further assist in the prevention of jamming at the outlet point of the hopper.

The cigarettes removed from the hopper in the flutes of the drum are carried round in the direction of the arrow, and they are removed from the flutes by a stripper plate 5 over the surface of which the cigarettes roll and fall into the scale pan 6 of the weighing mechanism. In the form of the invention illustrated, the weighing mechanism comprises a weigh beam 7, to one end of which the scale pan 6 is attached, whilst at the other end of the beam, a weight 8 is provided, against which the cigarette is balanced. To the weigh beam 7 there is attached an indicator 9, which moves over the surface of a scale 10, and so gives a visible indication of the weight of a cigarette being weighed. There is also provided on the weigh beam an arm 11, which moves with the pointer 9, and which is provided with a needle 12 operative to record the weight of the cigarette being weighed by making a perforation on a card or chart 13. The mechanism for perforating and moving the card is operatively connected to the drum 2 in such a manner that the parts are operated synchronously, the card being given one perforation and moved one step after each cigarette has been weighed.

The scale pane 6 is suspended from the weigh beam 7 by an arm 14, and the pan comprises a fixed side 15 which is attached to the arm 14, and the side of the pan opposite the fixed side is formed by a spring plate 16, which is fixed to the arm 14 at the point 17 in any suitable manner. The side 16 may be adjusted towards or away from the fixed side 15, by means of a screw 18 projecting through the fixed portion of the pan as shown in the drawing, for the purpose of enabling the pan to be used for weighing cigarettes of varying diameters.

The operation of the apparatus is as follows:—
A cigarette delivered from the hopper 1 by the drum 2 falls over the plate 5 in the manner above described, and drops into the scale pan 6, falling lengthwise between sides 16 and 1.6 The sides 15 and 16 are arranged so that they converge together towards the bottom of the pan, and at the point 19, the flexible side 16 and the fixed side 15 of the pan are separated from each other by a distance which is less than the diameter of a cigarette. It will be seen, therefore, that as each cigarette falls into the pan, it is gripped between the flexible and fixed sides of the pan, and is held in this position during the weighing operation. The flexible side 16 is arranged so that the weight of only one cigarette can be supported between the flexible and fixed sides of the scale pan, and by reason of this arrangement, when the next cigarette is dropped into the scale pan, the combined weight of the two cigarettes forces the side 16 away from the fixed side 15, so that the lower cigarette in the pan is released therefrom, and falls on to a conveyor 20, from which it is taken and placed into any suitable receptacle. As soon as the lower cigarette has been released, the side 16 again springs inwardly and holds the other cigarette in position whilst the weighing operation takes place. When the weigh beam 7 comes to rest, (a suitable time interval being allowed for this purpose) the needle 12 is operated to perforate the card or chart and thereafter the card is moved up one step. Since the parts 11 and 12 and the means for moving the chart and for effecting perforation thereof are driven in synchronism with the drum 2, one record is made showing the weight of each individual cigarette.

If desired, the bottom of the scale pan may be formed as shown in the drawing, and is arranged in a manner such that as a cigarette passes through the restricted space shown at 19, it passes into a chamber formed by the bent portion 21 of the flexible element 16, and the lowermost extremity of the fixed wall 15. This arrangement of the pan facilitates the removal of the cigarette which has been weighed, when the next succeeding cigarette reaches the restricted area at 19. In order to render the pan 6 capable of being used to weigh objects of varying cross-sectional area, the movable side 16 is arranged to be adjusted towards and away from the fixed side 15 by means of the adjusting screw 18. Thus if it is desired to weigh larger objects than those for which the pan is set it is only necessary to turn the adjusting screw 18 so that the distance between the fixed and movable sides is greater.

When the cigarettes are released from the scale pan, they may, as previously described, be deposited upon a conveyor 20, and may, if desired, be guided on to the conveyor by means of a guide such as the inclined plate 22, or if desired, they may be deposited into any suitable receptacle placed beneath the scale pan to receive the cigarettes as they drop therefrom.

What I claim as my invention and desire to secure by Letters Patent is:—

1. For a weighing apparatus, a scale pan comprising the combination with an element to suspend the scale pan from the weigh beam of the weighing apparatus, of at least two opposed walls between which the article to be weighted is gripped, said grip being sufficient to retain only one article in the scale pan, one of said walls being resiliently mounted.

2. For a weighing apparatus, a scale pan comprising the combination with an element to suspend the scale pan from the weigh beam of the weighing apparatus, of at least two opposed walls between which the article to be weighed is gripped, said grip being sufficient to retain only one article in the scale pan, one of said walls being resiliently mounted, and an adjusting element operative on said resiliently mounted wall to determine the grip on the article to be weighed.

3. For a weighing apparatus, a scale pan comprising the combination with an element to suspend the scale pan from a weigh beam of the weighing apparatus, of at least two opposed walls between which the article to be weighed is gripped, said grip being sufficient to retain only one article in the scale pan, one of said walls being resiliently mounted and having at its free end a recess in which the article is received and pressed against the opposed wall.

4. For a weighing apparatus, a scale pan comprising the combination with an element to suspend the scale pan from a weigh beam of the weighing apparatus, of at least two opposed walls between which the article to be weighed is gripped, said grip being sufficient to retain only one article in the scale pan, one of said walls being resiliently mounted and having at its free end a recess in which the article is received and pressed against the opposed wall, and an adjusting element operative on said resiliently mounted wall to determine the grip on the article to be weighed.

5. In apparatus for weighing articles of comparable mass, the combination with weight determining mechanism, of a scale pan associated with said mechanism, said scale pan including means responsive to the combined weight of an article deposited thereon and an article previously deposited thereon, for discharging said article previously deposited on said scale pan.

6. In apparatus for weighing articles of comparable mass, the combination with weight determining mechanism, of a scale pan associated with said mechanism, said scale pan including a flexible device constructed to receive and retain one article only on said pan, said device being positioned for flexure by a second article to permit release of the first article.

7. A scale pan for weighing cigarettes, said pan comprising spaced elements receiving cigarettes therebetween and adapted to yieldingly retain a cigarette on said pan, said elements being separable on passage of a further cigarette therebetween to an extent sufficient to release a previously retained cigarette.

8. A scale pan for weighing individual cigarettes, said pan comprising spaced walls formed to receive and retain one cigarette therebetween, said walls being separable in response to passage of a further cigarette therebetween to an extent sufficient to permit discharge of a retained cigarette from said pan.

9. A scale pan for weighing cigarettes, said pan comprising relatively movable elements cooperating to retain a cigarette, said elements being automatically displaceable in response to the depositing of a further cigarette in said pan for releasing a retained cigarette therefrom.

WALTER EVERETT MOLINS.